US012623539B2

(12) United States Patent          (10) Patent No.:     US 12,623,539 B2
    Ichikawa                            (45) Date of Patent:         May 12, 2026

(54) VEHICLE DISPLAY APPARATUS

(71) Applicant: Yazaki Corporation, Tokyo (JP)

(72) Inventor: Junichi Ichikawa, Shizuoka (JP)

(73) Assignee: YAZAKI CORPORATION, Tokyo (JP)

( * ) Notice:   Subject to any disclaimer, the term of this patent is extended or adjusted under 35 U.S.C. 154(b) by 0 days.

(21) Appl. No.: 19/042,237

(22) Filed:    Jan. 31, 2025

(65)          Prior Publication Data

US 2025/0170893 A1      May 29, 2025

Related U.S. Application Data

(63) Continuation of application No. PCT/JP2023/040353, filed on Nov. 9, 2023.

(30)          Foreign Application Priority Data

Dec. 14, 2022    (JP) ................................. 2022-199114

(51) Int. Cl.
    B60K 35/231          (2024.01)
(52) U.S. Cl.
    CPC .................................. B60K 35/231 (2024.01)
(58) Field of Classification Search
    CPC ...... B60K 35/22; B60K 35/231; B60K 35/60; B60K 35/00; B60K 35/23; G02B 27/01
    See application file for complete search history.

(56)          References Cited

U.S. PATENT DOCUMENTS 12,339,445 B2 *  6/2025  Tomomatsu ......... G02B 6/0046
    2014/0184996 A1  7/2014  Matsushita et al.
    2019/0162960 A1 * 5/2019  Harada .............. G02B 27/0101
    2022/0043259 A1 * 2/2022  Ichikawa .......... G02F 1/133602
    2022/0219533 A1 * 7/2022  Narushima ........ G02B 27/0093

FOREIGN PATENT DOCUMENTS

CN      114545637 A      5/2022
    JP      2005347144 A  * 12/2005  .............. F21S 43/14
    JP      2006-011168 A    1/2006
    JP      6027727 B2      11/2016
    JP      2019-101056 A    6/2019
    WO      2020/158603 A1   8/2020

* cited by examiner

*Primary Examiner* — Ke Xiao
    (74) *Attorney, Agent, or Firm* — Sughrue Mion, PLLC

(57)          ABSTRACT

A vehicle display apparatus includes a display device that emits display light toward a display surface of a vehicle, and a main housing. The display device includes a display including a display screen, a backlight including an LED substrate, and a device housing to which the LED substrate is assembled. The display screen is disposed to be inclined with respect to an optical axis of the emission light. The LED substrate is disposed to face the display screen. The plurality of LED chips are arranged along an inclination of the display screen to be shifted stepwise with respect to the optical axis direction along the optical axis.

8 Claims, 3 Drawing Sheets

VEHICLE DISPLAY APPARATUS

CROSS-REFERENCE TO RELATED APPLICATION

This application is a continuation application of International Application No. PCT/JP2023/040353 filed on Nov. 9, 2023 which claims the benefit of priority from Japanese Patent Application No. 2022-199114 filed on Dec. 14, 2022 and designating the U.S., the entire contents of which are incorporated herein by reference.

BACKGROUND OF THE INVENTION

1. Field of the Invention

The present invention relates to a vehicle display apparatus.

2. Description of the Related Art

For example, Japanese Patent No. JP 6 027 727 B2 discloses a vehicle display apparatus including an indicator, a light source that illuminates the indicator, and a retardation plate (λ/4 plate or λ/2 plate) provided for display light emitted by the indicator.

Meanwhile, in the vehicle display apparatus described in Japanese Patent No. JP 6 027 727 B2 described above, when external light enters a housing of the device, in a case where the display surface is disposed to be inclined with respect to the optical axis in order to prevent light reflected by the display surface of the indicator mounted in the housing from returning to the eyes of the occupant, there is a possibility that the housing of the indicator becomes large according to the inclination and the entire vehicle display apparatus becomes large. Therefore, there is room for further improvement in terms of mountability to the vehicle.

SUMMARY OF THE INVENTION

The present invention has been made in view of the above circumstances, and an object thereof is to provide a vehicle display apparatus capable of realizing space saving.

In order to achieve the above mentioned object, a vehicle display apparatus according to one aspect of the present invention includes: a display device that is mounted on a vehicle and emits, as display light, an image to be visually recognized as a virtual image by an occupant of the vehicle toward a display surface provided on the vehicle; and a main housing that accommodates the display device therein and has an opening through which the display light is emitted toward the display surface, wherein the display device includes a display including a display screen capable of displaying the display light, a backlight including an LED substrate which a plurality of LED chips are mounted on a substrate, the backlight irradiating the display with emission light, and a device housing accommodating the backlight therein, the display screen is disposed to be inclined with respect to an optical axis of the emission light, the LED substrate is disposed facing the display screen, and the plurality of LED chips are arranged along an inclination of the display screen to be shifted stepwise with respect to an optical axis direction along the optical axis.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the drawings. Note that the invention is not limited by the embodiments. In addition, constituent elements in the following embodiments include those that can be easily replaced by those skilled in the art or those that are substantially the same.

Embodiment

A vehicle display apparatus 1 is applied to a vehicle 400 such as an automobile, and is a head-up display apparatus mounted in an instrument panel (not illustrated) provided on a dashboard of the vehicle 400.

Figure 1:
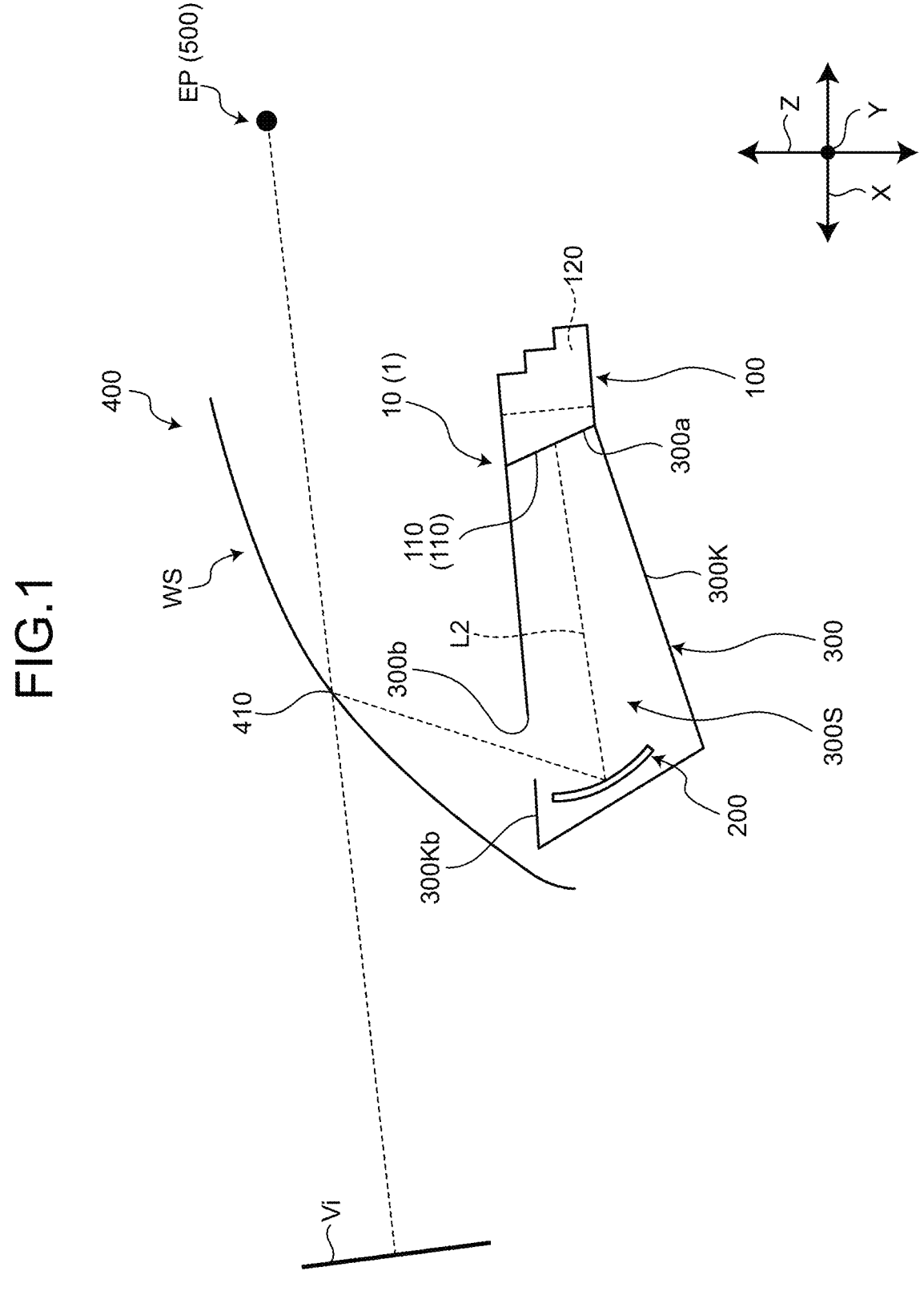
FIG. 1 is a diagram illustrating a schematic configuration of a vehicle display apparatus according to an embodiment.
Figure 2:
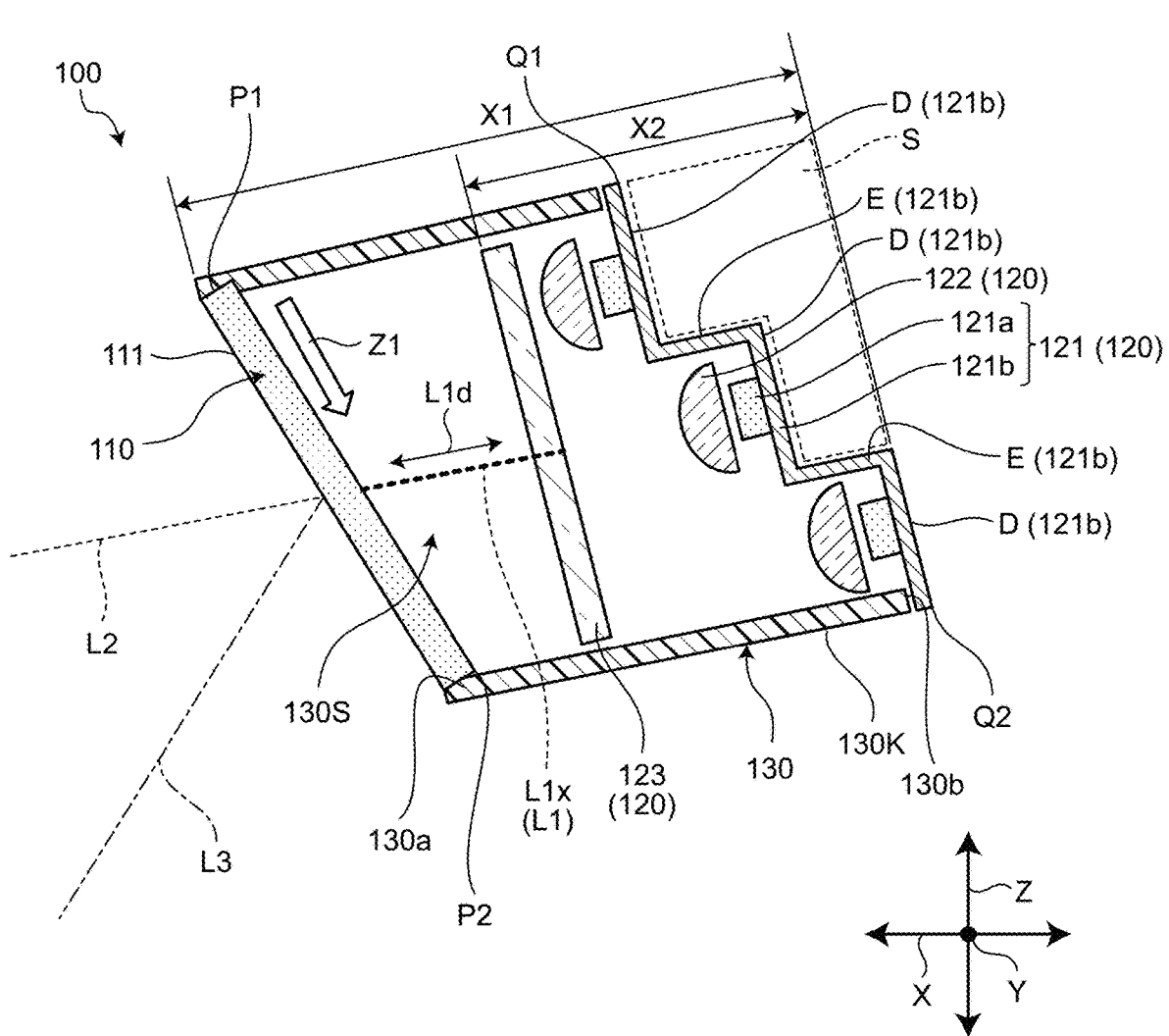
FIG. 2 is a diagram illustrating a schematic configuration of a display device constituting the vehicle display apparatus according to the embodiment.

As illustrated in FIGS. 1 and 2, the vehicle display apparatus 1 includes an indicator 10 and a control unit (not illustrated), and the indicator 10 includes a display device 100, a mirror 200, and a main housing 300. In addition, the display device 100 includes a display 110 including a display screen 111 capable of displaying display light L2, a backlight 120 including an LED substrate 121 as a light source, and a device housing 130. The vehicle display apparatus 1 reflects the display light L2, which is emitted from the display device 100 toward a display surface 410 provided in the front portion of the vehicle 400, toward the eye point (viewing position) EP side, so that the image reflected on the display surface 410 can be visually recognized as a virtual image Vi viewed overlapping a scene viewed from the eye point EP. The eye point EP with respect to the vehicle display apparatus 1 is a position of a viewpoint of a driver 500 who is an occupant of the vehicle 400, and is assumed in advance as a spatial region. In addition, the display surface 410 on which the display light L2 emitted from the display device 100 is reflected is configured by a windshield WS provided in the front portion of the vehicle 400. However, the form of the display surface 410 is not particularly limited, and may be, for example, a transparent or translucent panel (for example, a combiner) provided on the driver 500 side of the windshield WS. In addition, in the vehicle display apparatus 1, unless otherwise specified, a connection method between respective components for supplying power, transmitting and receiving control signals, various types of information, and the like may be any of wired connection (for example, optical communication via an optical fiber is also included) via a wiring member such as an electric wire or an optical fiber, and wireless connection such as wireless communication or contactless power supply.

The vehicle display apparatus 1 of the present embodiment achieves space saving by arranging the LED substrate 121 to be shifted stepwise along the inclination of the display screen 111. Hereinafter, each configuration of the vehicle display apparatus 1 will be described in detail with reference to FIGS. 1 and 2.

The width direction of the vehicle display apparatus 1 typically corresponds to a vehicle width direction Y of the vehicle 400 to which the vehicle display apparatus 1 is applied. The depth direction of the vehicle display apparatus 1 typically corresponds to the front-rear direction X (in other words, the traveling direction of the vehicle 400) of the vehicle 400 to which the vehicle display apparatus 1 is applied. The front surface side of the vehicle display apparatus 1 is a side facing the driver's seat of the vehicle 400, and typically corresponds to a side visually recognized by the driver 500 sitting on the driver's seat. On the other hand, the back surface side of the vehicle display apparatus 1 is the side opposite to the front surface side in the depth direction, and typically corresponds to the side accommodated in the instrument panel.

In the following description, in the front-rear direction X of the vehicle 400, a side on which the vehicle 400 moves forward may be referred to as a "front side", and a side on which the vehicle 400 moves backward may be referred to as a "rear side". In the vehicle width direction Y of the vehicle 400, a left side facing forward in the front-rear direction X may be referred to as a "left side", and a right side facing forward in the front-rear direction X may be referred to as a "right side". In the height direction Z of the vehicle 400, an upper side in the vertical direction may be referred to as an "upper side", and a lower side in the vertical direction may be referred to as a "lower side". Each direction used in the following description indicates a direction in a state in which each part is assembled to each other unless otherwise specified.

In the following description, in the display device 100, light emitted from the display screen 111 of the display 110 is referred to as display light L2. In addition, parallel light emitted from a field lens 123 of the backlight 120 is referred to as emission light L1, and an axis of the emission light L1 is referred to as an optical axis L1$x$. Further, the extending direction of the optical axis L1$x$ is referred to as an optical axis direction L1$d$.

Indicator

The indicator 10 is located between the windshield WS and the eye point EP with respect to the front-rear direction X, and is a portion capable of causing the driver 500 to recognize the situation of the vehicle 400 by projecting the virtual image Vi on the windshield WS.

The display device 100 emits the display light L2 toward the mirror 200. When the emission light L1 is emitted from the backlight 120 to the display 110, the display device 100 can display an image on the display screen 111 of the display 110 and output the image as the display light L2. Note that details of the display device 100 will be described later.

The mirror 200 reflects the display light L2 toward the windshield WS. As illustrated in FIG. 1, the mirror 200 has a concave reflecting surface, and can enlarge an image. Note that the shape of the reflecting surface is, for example, a free-form surface, and can be a shape capable of correcting image distortion and aberration.

The main housing 300 is formed of a resin material or the like, and is formed in a box shape, so that the display device 100, the mirror 200, and the like can be accommodated in the inside (internal space portion 300S). As illustrated in FIG. 1, the main housing 300 of the present embodiment is formed by a wall portion 300K, and includes an assembly opening 300$a$ to which the display device 100 can be assembled and an opening 300$b$ through which the display light L2 can be emitted toward the outside.

As illustrated in FIG. 1, the assembly opening 300$a$ is located on the rear side of the main housing 300 and is formed to open along the front-rear direction X. In addition, the display device 100 is assembled such that the rear side of the device housing 130 is exposed to the outside of the main housing 300. Therefore, the display device 100 is assembled to the main housing 300 such that the display light L2 emitted from the display 110 is emitted toward the front side, and the periphery of the display 110 is covered by the wall portion 300K, whereby the display light L2 is shielded.

On the other hand, as illustrated in FIG. 1, the opening 300$b$ is provided in a wall portion 300Kb located on the upper side (the side on which the display surface 410 is located) of the main housing 300, and is formed to open along the height direction Z. Therefore, when the display light L2 emitted from the display 110 is directed toward the opening 300$b$ via the mirror 200 or the like, the main housing 300 can emit the display light L2 toward the outside. Therefore, the indicator 10 can emit the display light L2 toward the display surface 410 located above the opening 300$b$ in a state of being mounted in the instrument panel. The opening 300$b$ may be closed by a transparent cover that can transmit the display light L2.

Control Unit

The control unit is configured as a microcomputer and can control the indicator 10. The control unit can acquire the situation of the vehicle 400 from a device mounted on the vehicle 400, a server, or the like. Furthermore, the control unit generates an image on the basis of the acquired information, and displays the image on the display screen 111 of the display 110, thereby executing processing of superimposing and displaying the virtual image Vi with color to be viewed from the eye point EP.

Display Device

Next, details of the display device 100 will be described.

The display 110 is a portion that emits the emission light L1 as the display light L2 by transmitting the emission light. The display screen 111 of the display 110 includes a light transmissive thin film transistor (TFT) liquid crystal display or the like.

The backlight 120 is a unit including an LED substrate 121, a condenser lens 122, and a field lens 123.

The LED substrate 121 includes a plurality of LED chips 121$a$ and a substrate 121$b$ on which each LED chip 121$a$ can be mounted. The substrate 121$b$ is made of a metal material such as aluminum, and is a member that can fix the LED chip 121$a$ to one surface by being formed in a flat plate shape. Meanwhile, the LED chip 121$a$ is a light source including a light emitting diode, and is a member that emits light when power is supplied from a power source (not illustrated) such as a secondary battery of the vehicle 400. The LED chips 121$a$ are arranged in a lattice shape on the substrate 121$b$, and are arranged so as to face the display screen 111 in a state where the substrate 121$b$ is assembled to the device housing 130, whereby light can be emitted toward the display screen 111.

The condenser lens 122 is a lens made of glass or a transparent resin. The condenser lens 122 has an incident surface formed of a flat surface and an emission surface formed of a convex curved surface, and is disposed such that the incident surface faces the LED chip 121$a$. As illustrated in FIG. 2, each of the condenser lenses 122 is provided on the LED chip 121a, so that light emitted from the LED chip 121a can be condensed.

The field lens 123 is a lens made of glass or a transparent resin. The field lens 123 has an incident surface and an emission surface, and is disposed such that the incident surface faces the condenser lens 122. As illustrated in FIG. 2, the field lens 123 is provided between the condenser lens 122 and the display screen 111, so that the traveling direction of the incident light incident from the condenser lens 122 can be adjusted to a predetermined direction. Therefore, the backlight 120 can emit parallel light toward the display screen 111.

The device housing 130 is made of a resin material or the like, and is formed in a box shape, so that the display 110, the backlight 120, and the like can be accommodated in the inside (internal space portion 130S). As illustrated in FIGS. 1 and 2, the device housing 130 of the present embodiment is formed by a wall portion 130K, and includes an assembly opening 130a to which the display 110 can be assembled and an assembly opening 130b to which the LED substrate 121 constituting the backlight 120 can be assembled.

As illustrated in FIGS. 1 and 2, the assembly opening 130a is located on the front side of the device housing 130 and is formed to open along the front-rear direction X in a state where the display device 100 is assembled to the main housing 300. In addition, the display screen 111 of the display 110 is assembled to the assembly opening 130a, and is arranged to be inclined in an inclination direction Z1 with respect to the optical axis L1x of the emission light L1 in a state of being mounted in the instrument panel. More specifically, the display screen 111 of the present embodiment is inclined such that an end portion P1 located on the opening 300b side (the display surface 410 side) of the main housing 300 in the height direction Z is formed to protrude forward (the display screen 111 side in the optical axis direction L1d of the optical axis L1x) in the emission direction of the emission light L1. At this time, in the display device 100, the end portion P1 of the display screen 111 is disposed on the front side of the end portion P2 located on the opposite side to the opening 300b side, so that a reflected light L3 reflected by the display screen 111 can be directed toward an end portion P2 side when the external light enters the main housing 300 through the opening 300b. Therefore, the display device 100 can change the path of the light such that the external light reflected by the display screen 111 does not return to the eyes of the driver 500 by being emitted from the opening 300b again after following the incident path.

On the other hand, as illustrated in FIG. 2, the assembly opening 130b is located on the back side of the device housing 130 and is formed to open along the front-rear direction X in a state where the display device 100 is assembled to the main housing 300. The LED substrate 121 constituting the backlight 120 is assembled to a predetermined portion of the wall portion 130K of the device housing 130 by a fastening member such as a screw so as to close the assembly opening 130b. More specifically, as illustrated in FIG. 2, in the backlight 120 of the present embodiment, the field lens 123, the condenser lens 122, and the LED substrate 121 are arranged in this order from the display screen 111 side, and the LED substrate 121 is assembled at a position exposed to the outside of the main housing 300. In the LED substrate 121, an end portion Q1 located on the opening 300b side (the display surface 410 side) of the main housing 300 in the height direction z protrudes forward in the emission direction of the emission light L1 from an end portion Q2 located on the opposite side to the opening 300b side.

In the LED substrate 121 of the present embodiment, as illustrated in FIG. 2, the substrate 121b is formed in a stepwise shape, and the substrate 121b is alternately formed with a facing portion D located to face the display screen 111 and a connecting portion E located to intersect with the facing portion D and connecting the facing portions D to each other. Further, the LED substrate 121 is configured such that a distance X1 from the facing portion D of the substrate 121b to the display screen 111 becomes a constant value when assembled to the assembly opening 130b. In addition, by arranging the LED chip 121a on each of the facing portions D of the LED substrate 121, the LED chip 121a is arranged to face the display screen 111 and is arranged to be shifted stepwise with respect to the emission direction of the emission light L1. Therefore, in the LED substrate 121, the LED chip 121a can be arranged along the inclination of the display screen 111, and the distance from the LED chip 121a to the display screen 111 can be set to a constant value. The method of processing the substrate 121b is not particularly limited, and the substrate is formed in a stepped shape by bending or the like.

In the display device 100 of the present embodiment, the LED substrate 121 configured as described above is assembled to the assembly opening 130b of the device housing 130, whereby a height X2 of the backlight 120 accommodated in the internal space portion 130S can be reduced. Therefore, the main housing 300 is smaller in size (volume) than when the substrate 121b is formed along the height direction Z with reference to the position of the end portion Q2 illustrated in FIG. 2, that is, when the substrate 121b is formed linearly.

In addition, since the substrate 121b is formed in a stepwise shape, the surface area of the LED substrate 121 can be increased. As compared with the case where the substrate 121b is formed in a linear shape, the surface area of the substrate is increased by the amount of the connecting portion E located between the facing portions D. Therefore, the LED substrate 121 can efficiently release heat generated when the LED chip 121a emits light. Further, in the LED substrate 121, since the substrate 121b is assembled in the opening of the device housing 130 and one surface of the substrate 121b is assembled so as to be exposed from the main housing 300, heat generated when the LED chip 121a emits light can be efficiently released.

In addition, since the substrate 121b of the LED substrate 121 is formed in a stepwise shape, an external space portion S formed on the opposite side to the display screen 111 side with the LED substrate 121 interposed therebetween is formed in a stepwise shape along the inclination of the display screen 111. In addition, since the end portion Q1 of the LED substrate 121 located on the upper side of the substrate 121b is formed to protrude forward from the end portion Q2 located on the lower side in the emission direction of the emission light L1, the external space portion S is located to protrude toward the display screen 111 in the optical axis direction L1d with respect to the portion of the substrate 121b located on the end portion Q1 side with respect to the portion located on the end portion Q2 side of the substrate 121b. Therefore, the external space portion S can release heat, which is generated when the LED chip 121a emits light, upward.

The vehicle display apparatus 1 described above includes the display device 100 that is mounted on the vehicle 400 and emits an image to be visually recognized as the virtual image Vi by the driver 500 who is an occupant of the vehicle 400 as the display light L2 toward the display surface 410 provided in the vehicle 400, and the main housing 300 that accommodates the display device 100 therein and has the opening 300b that emits the display light L2 toward the display surface 410. In addition, the display device 100 includes the display 110 including the display screen 111 capable of displaying the display light L2, the backlight 120 including the LED substrate 121 on which a plurality of LED chips 121a is mounted on a substrate 121b and irradiating the display 110 with the emission light L1, and the device housing 130 accommodating the LED substrate 121 therein. In addition, the display screen 111 is arranged to be inclined with respect to the optical axis L1x of the emission light L1, the LED substrate 121 is arranged to face the display screen 111, and the plurality of LED chips 121a are arranged along the inclination of the display screen 111 so as to be shifted stepwise with respect to the optical axis direction L1d along the optical axis L1x.

According to such a configuration, in the display device 100, since the LED chip 121a of the LED substrate 121 is arranged to be shifted stepwise, the height X2 of the backlight 120 accommodated therein can be suppressed. Therefore, the display device 100 can suppress the volume as compared with the case where the LED chip 121a is linearly arranged, and accordingly, the vehicle display apparatus 1 can suppress the volume of the portion exposed to the outside of the main housing 300. Therefore, the vehicle display apparatus 1 can realize space saving.

Further, the substrate 121b described above is formed of a metal material in a stepwise shape along the inclination of the display screen 111, and each of the LED chips 121a is arranged on a surface (facing portion D) facing the display screen 111 in the substrate 121b formed in a stepwise shape. According to such a configuration, since the substrate 121b is formed in a stepwise shape, the surface area can be increased as compared with a case where the substrate is formed in a linear shape. Therefore, the LED substrate 121 can efficiently dissipate heat generated when the LED chip 121a emits light via the substrate 121b.

Furthermore, the display screen 111 of the vehicle display apparatus 1 described above is arranged to be inclined with respect to the optical axis L1x of the emission light L1 such that the reflected light L3 reflected by the display screen 111 is directed to the opposite side to the side where the opening 300b is located when the external light enters the main housing 300 through the opening 300b. Further, the external space portion S formed on the side opposite to the display screen 111 side with the LED substrate 121 interposed therebetween is formed in a stepwise shape along the inclination of the display screen 111, and a portion located on the opening 300b side is located so as to protrude toward the display screen 111 side in the optical axis direction L1d with respect to a portion located on the side opposite to the opening 300b side. According to such a configuration, the display device 100 can suppress the volume of the portion located on the opening 300b side (the portion located on the upper side in the height direction Z) as compared with the case where the LED chip 121a is linearly arranged. In addition, when the gas around the LED substrate 121 expands due to the heat generated when the LED chip 121a emits light and the gas tries to escape upward, the display device 100 can efficiently release the heat contained in the gas to the outside of the main housing 300 by efficiently releasing the gas.

Note that the above-described vehicle display apparatus 1 of the present invention is not limited to the above-described embodiment, and various modifications can be made within the scope described in the claims.

For example, the inclination direction Z1 of the display screen 111 is not particularly limited. As illustrated in FIG. 2, the display screen 111 has been described as being formed such that the end portion P1 located on the opening 300b side of the main housing 300 protrudes forward. However, the end portion P2 located on the side opposite to the opening 300b side may protrude forward.

In addition, a method of assembling the LED substrate 121 to the device housing 130 is not particularly limited, and the shape of the substrate 121b of the LED substrate 121 is not particularly limited as long as the LED chip 121a is arranged along the inclination of the display screen 111 and is arranged to be shifted stepwise with respect to the optical axis direction L1d along the optical axis L1x. As illustrated in FIG. 2, the LED substrate 121 has been described as being directly assembled to the assembly opening 130b of the device housing 130, but may be indirectly assembled via another structural member that can be assembled to the assembly opening 130b.

Figure 3:
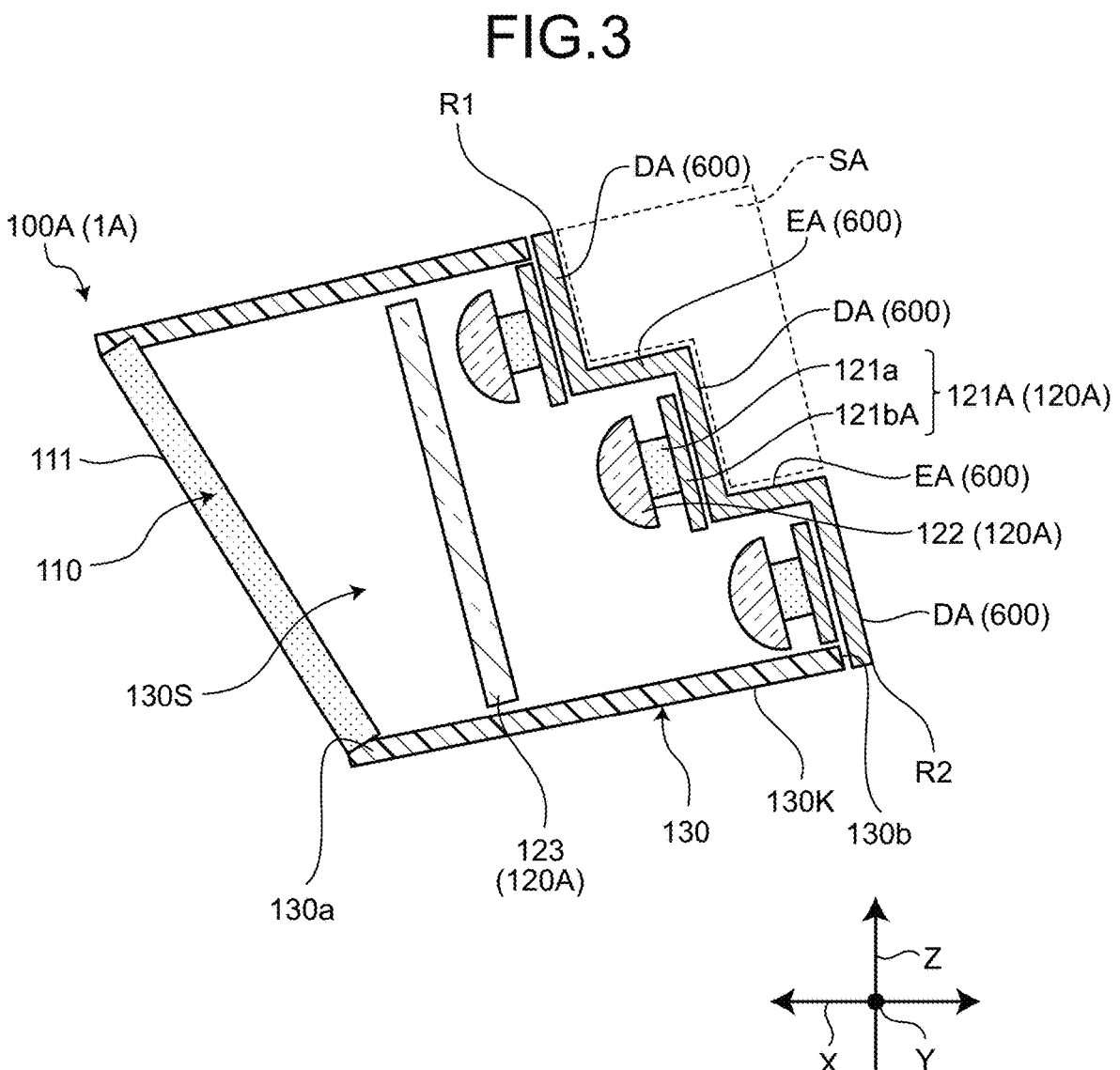
FIG. 3 is a diagram illustrating a schematic configuration of a display device constituting a vehicle display apparatus according to a modification of the embodiment.

For example, FIG. 3 illustrates a display device 100A applied to a vehicle display apparatus 1A according to a modification. The display device 100A includes a display 110, a backlight 120A, and a device housing 130, and further includes a radiation plate 600 that can be assembled to the assembly opening 130b of the device housing 130.

The radiation plate 600 is a so-called heat sink, and is made of a metal material. In addition, the radiation plate 600 is formed in a stepwise shape along the inclination of the display screen 111, and a facing portion DA located to face the display screen 111 and a connecting portion EA located to intersect with the facing portion DA are alternately formed. In addition, in the radiation plate 600, an end portion R1 located on the opening 300b side (the display surface 410 side) of the main housing 300 in the height direction Z is formed to protrude forward in the emission direction of the emission light L1 from an end portion R2 located on the side opposite to the opening 300b side.

The backlight 120A includes a plurality of LED substrates 121A, a condenser lens 122, and a field lens 123, and the LED substrate 121A includes a band-shaped substrate 121bA and a plurality of LED chips 121a linearly arranged on the substrate 121bA. The LED substrates 121A are respectively assembled to the facing portions DA of the radiation plates 600 by fastening members such as screws. Then, the radiation plate 600 to which the LED substrate 121A is assembled is assembled to close the assembly opening 130b by being assembled to a predetermined portion of the wall portion 130K of the device housing 130. Therefore, each of the LED chips 121a is arranged together with the substrate 121bA on the surface facing the display screen 111 in the radiation plate 600 formed in a stepped shape, and is arranged along the inclination of the display screen 111 to be shifted stepwise with respect to the optical axis direction L1d along the optical axis L1x.

In addition, an external space portion SA formed on the side opposite to the display screen 111 side with the LED substrate 121A interposed therebetween is formed in a stepwise shape similarly to the external space portion S described above, and a portion located on the opening 300b side is located to protrude forward in the emission direction of the emission light L1 with respect to a portion located on the side opposite to the opening 300b side.

According to such a configuration, similarly to the substrate 121b described above, the radiation plate 600 is configured such that the distance from the facing portion DA to the display screen 111 has a constant value, whereby the distance from the LED chip 121a to the display screen 111 can be set to a constant value. In addition, the LED substrate 121A can efficiently dissipate heat generated when the LED chip 121a emits light via the radiation plate 600 by being assembled to the radiation plate 600 having high thermal conductivity. In addition, the display device 100A can suppress the height of the backlight 120A accommodated therein, similarly to the display device 100 described above, and accordingly, the vehicle display apparatus 1A can suppress the volume of the portion exposed to the outside of the main housing 300. Therefore, the vehicle display apparatus 1A can realize space saving. Furthermore, in a similar manner to the external space portion S described above, the external space portion SA is formed in a stepwise shape along the inclination of the display screen 111, so that heat generated when the LED chip 121a emits light can be efficiently released to the outside of the main housing 300.

Note that the vehicle display apparatuses 1 and 1A according to the present embodiment may be configured by appropriately combining the components of the above-described embodiments and modifications.

The vehicle display apparatus according to the present embodiment can achieve space saving.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display apparatus comprising:
a display device that is mounted on a vehicle and emits, as display light, an image to be visually recognized as a virtual image by an occupant of the vehicle toward a display surface provided on the vehicle; and
a main housing that accommodates the display device therein and has an opening through which the display light is emitted toward the display surface, wherein
the display device includes a display including a display screen capable of displaying the display light, a backlight including an LED substrate having a plurality of LED chips mounted on a substrate, the backlight irradiating the display with emission light, and a device housing accommodating the backlight therein,
the display screen is disposed to be inclined with respect to an optical axis of the emission light,
the LED substrate is disposed facing the display screen,
the plurality of LED chips are arranged along an inclination of the display screen to be shifted stepwise with respect to an optical axis direction along the optical axis,
the substrate is formed of a metal material and includes alternately formed facing portions located to face the display screen and connecting portions located to intersect with the facing portions and connecting the facing portions to each other, and
the display screen is disposed so as to be inclined with respect to an optical axis of the emission light such that reflected light reflected by the display screen is directed to a side opposite to a side where the opening is located when external light enters the main housing through the opening.

2. The vehicle display apparatus according to claim 1, wherein
the substrate is formed in a stepwise shape along an inclination of the display screen, and each of the LED chips is disposed on a surface facing the display screen on the substrate formed in a stepped shape.

3. The vehicle display apparatus according to claim 1, wherein
an external space portion formed on a side opposite to the display screen side across the LED substrate is formed stepwise along an inclination of the display screen, and a portion located on the opening side is located so as to protrude toward the display screen side in the optical axis direction with respect to a portion located on a side opposite to the opening side.

4. The vehicle display apparatus according to claim 2, wherein
an external space portion formed on a side opposite to the display screen side across the LED substrate is formed stepwise along an inclination of the display screen, and a portion located on the opening side is located so as to protrude toward the display screen side in the optical axis direction with respect to a portion located on a side opposite to the opening side.

5. A vehicle display apparatus comprising:
a display device that is mounted on a vehicle and emits, as display light, an image to be visually recognized as a virtual image by an occupant of the vehicle toward a display surface provided on the vehicle; and
a main housing that accommodates the display device therein and has an opening through which the display light is emitted toward the display surface, wherein
the display device includes a display including a display screen capable of displaying the display light, a backlight including an LED substrate having a plurality of LED chips mounted on a substrate, the backlight irradiating the display with emission light, and a device housing accommodating the backlight therein,
the display screen is disposed to be inclined with respect to an optical axis of the emission light,
the LED substrate is disposed facing the display screen,
the plurality of LED chips are arranged along an inclination of the display screen to be shifted stepwise with respect to an optical axis direction along the optical axis,
the display device has a radiation plate made of a metal material and including alternately formed facing portions located to face the display screen and connecting portions located to intersect with the facing portions and connecting the facing portions to each other, and
the display screen is disposed so as to be inclined with respect to an optical axis of the emission light such that reflected light reflected by the display screen is directed to a side opposite to a side where the opening is located when external light enters the main housing through the opening.

6. The vehicle display apparatus according to claim 5, wherein
the radiation plate is formed in a stepwise shape along an inclination of the display screen, and
each of the LED chips is disposed together with the substrate on a surface facing the display screen in the radiation plate formed in a stepwise shape.

7. The vehicle display apparatus according to claim 5, wherein an external space portion formed on a side opposite to the display screen side across the LED substrate is formed stepwise along an inclination of the display screen, and a portion located on the opening side is located so as to protrude toward the display screen side in the optical axis direction with respect to a portion located on a side opposite to the opening side.

8. The vehicle display apparatus according to claim 6, wherein an external space portion formed on a side opposite to the display screen side across the LED substrate is formed stepwise along an inclination of the display screen, and a portion located on the opening side is located so as to protrude toward the display screen side in the optical axis direction with respect to a portion located on a side opposite to the opening side.

\* \* \* \* \*